(12) United States Patent
Chang et al.

(10) Patent No.: US 12,220,959 B2
(45) Date of Patent: Feb. 11, 2025

(54) ROLL CONTROL SYSTEM FOR CORNER MODULE OF VEHICLE

(71) Applicants: Hyundai Motor Company, Seoul (KR); Kia Corporation, Seoul (KR)

(72) Inventors: Sehyun Chang, Gyeonggi-Do (KR); Sang Woo Hwang, Seoul (KR); Min Jun Kim, Busan (KR); Youngil Sohn, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 185 days.

(21) Appl. No.: 17/993,128

(22) Filed: Nov. 23, 2022

(65) Prior Publication Data
US 2023/0278384 A1    Sep. 7, 2023

(30) Foreign Application Priority Data
Mar. 3, 2022    (KR) .................... 10-2022-0027343

(51) Int. Cl.
*B60G 17/016*    (2006.01)
*B60G 17/015*    (2006.01)

(52) U.S. Cl.
CPC ..... *B60G 17/0162* (2013.01); *B60G 17/0157* (2013.01); *B60G 2204/45* (2013.01);
(Continued)

(58) Field of Classification Search
CPC .. B60G 17/00; B60G 17/005; B60G 17/0162; B60G 17/0165; B60G 17/033; B60G 17/157; B60G 2204/4232; B60G 2204/43; B60G 2204/45; B60G 2204/62; B60G 2400/0511; B60G 2400/252; B60G 2400/40; B60G 2400/82; B60G 2200/422; B60G 2200/44; B60G 2202/42; B60G 2206/011; B60G 2206/50; B60G 2300/50; B60G 2800/012; B60G 7/04; B62D 7/00; B62D 7/18
See application file for complete search history.

(56) References Cited

U.S. PATENT DOCUMENTS 7,163,097 B2    1/2007  Acosta
2022/0134826 A1*  5/2022  Wubben ............. B62D 49/0607
                                              280/124.162

FOREIGN PATENT DOCUMENTS

JP    4956378 B2    6/2012
JP    6658965 B2    3/2020
(Continued)

*Primary Examiner* — Aaron L Troost
(74) *Attorney, Agent, or Firm* — Fox Rothschild LLP

(57) ABSTRACT

A roll control system for a corner module of a vehicle includes a knuckle that is coupled to a strut, positioned inside a wheel, and movable in upward and downward directions, a stopper that selectively moves in a downward direction and limits a range that the knuckle moves in the upward and downward directions, a power transmission unit that transmits power for moving the stopper in the downward direction, a clutch connected to the power transmission unit for transmitting a rotational force to the power transmission as a control motor is driven, and a controller electrically connected to the control motor for transmitting a power transmission signal to the control motor to control the stopper to selectively move in the upward and downward directions.

16 Claims, 8 Drawing Sheets

(52) U.S. Cl.
CPC .... *B60G 2204/62* (2013.01); *B60G 2400/252* (2013.01); *B60G 2400/40* (2013.01); *B60G 2400/82* (2013.01)

(56) References Cited

FOREIGN PATENT DOCUMENTS

| | | |
|---|---|---|
| JP | 6918035 B2 | 8/2021 |
| KR | 2016-0069125 A | 6/2016 |
| WO | 2020-181185 A1 | 9/2020 |

\* cited by examiner

ROLL CONTROL SYSTEM FOR CORNER MODULE OF VEHICLE

CROSS-REFERENCE TO RELATED APPLICATION

This application claims under 35 U.S.C. § 119(a) the benefit of and priority to Korean Patent Application No. 10-2022-0027343 filed on Mar. 3, 2022, the entire contents of which are incorporated herein by reference.

BACKGROUND

(a) Technical Field

The present disclosure relates to a roll control system for a corner module of a vehicle, and more specifically, to a roll control system for a corner module of a vehicle capable of minimizing the continuous use of power required to control a roll behavior with respect to a drive motor of the corner module individually provided on each wheel of a vehicle.

(b) Background Art

In general, an electronic corner module (e-corner module) is a module device for a vehicle configured by integrating a drive device, a steering device, a braking device, and a suspension device in the form of an integrated component combination and is a system that does not require complicated drive-related mechanical devices such as an engine or a drive shaft and steering-related mechanical devices such as a gearbox unlike internal combustion engine vehicles.

When the e-corner module is applied to the vehicle, it becomes a drive device capable of independently steering vehicle wheels, so that it is possible to improve the responsiveness and traveling stability of the wheels, and save the energy.

In addition, when the e-corner module is applied to the vehicle, each wheel may be controlled to be independently driven and steered in the vehicle, so that it is possible to greatly reduce the turning radius when the vehicle is rotated.

In addition, various behaviors of the vehicle such as a two-wheel turn, a four-wheel turn, an omnidirection move (diagonal traveling), a zero radius turn, a vertical parking (90° parking), and the like are possible.

Typically, main core technologies in the e-corner module include a motor, an electric brake, an electric steering system, an electric damper (e-Dam per), and the like.

Here, the motor system is a system in which an independent drive motor is mounted on each wheel of the vehicle to drive each wheel individually, and the entire wheel may be individually controlled, so that there are the advantages in that stability during cornering is excellent, and there is no energy wasted in the process of transmitting power from the drive motor to the wheels, thereby greatly improving fuel efficiency.

In addition, the electric brake is a friction braking device configured to generate a braking force with the power of a motor other than hydraulic pressure, and not only have an excellent braking responsiveness, but also can distribute the braking force to the front and rear wheels of the vehicle as necessary, thereby increasing traveling stability.

In addition, when a driver operates a steering wheel, an electric steering device is configured to perform an independent remote steering control for each vehicle wheel based on steering input information such as a steering angle detected through a sensor.

In addition, the conventional electric damper is configured to absorb vertical vibrations during traveling between the vehicle wheels and the vehicle body and adjust a vehicle height according to the traveling situation.

Among the core technologies of the e-corner module, the motor system is configured to perform the continuous operation in order to control a roll behavior of each wheel, but this may cause a problem of unnecessary power consumption, so that the improvement accordingly is needed.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

An object of the present disclosure is to provide a roll control system for a corner module of a vehicle, which controls a bump stopper to move in a downward direction toward a knuckle in a longitudinal direction of a sliding pillar by driving a control motor when it is determined that a roll has occurred based on a difference between left and right wheel strokes of front/rear corner modules with respect to an e-corner module independently provided on each wheel of a vehicle to reduce a gap between the bump stopper and the knuckle, thereby allowing a roll behavior to be controlled using a reaction force of the bump stopper due to the limitation of a stroke range of the knuckle.

A roll control system for a corner module of a vehicle according to the present disclosure includes a knuckle unit coupled to a strut, the knuckle unit and strut being configured to be positioned inside a wheel, the knuckle unit being configured to move in an upward direction and a downward direction along a first pillar and a second pillar of a pair of sliding pillars supported by a fixing frame, a stopper unit configured to selectively move in a downward direction along the pair of sliding pillars and limit a range in which the knuckle unit moves in the upward direction and the downward direction, a power transmission unit connected to at least one pillar of the pair of sliding pillars and being configured to transmit power for selectively moving the stopper unit in the downward direction, a clutch unit connected to the power transmission unit and being configured to transmit a rotational force to the power transmission unit upon driving of a control motor is driven, and a control unit configured to be electrically connected to the control motor and being configured to selectively transmit a power transmission signal to the control motor to control the stopper unit to selectively move in the upward direction and the downward direction.

Here, the stopper unit includes a first bump stopper mounted on of the first pillar of the pair of sliding pillars inside the fixing frame and being spaced apart from the knuckle unit, a second bump stopper having the same shape as that of the first bump stopper and being mounted on the second pillar of the pair of sliding pillars, and a bump stopper link connected to the first bump stopper and the second bump stopper and being configured to guide the first bump stopper and the second bump stopper to move in the downward direction.

The power transmission unit includes a case configured to accommodate a one end of the first sliding pillar inside of the case, the one end protruding outside the fixing frame; and a drive member gear-coupled to the first sliding pillar inside of the case and being configured to receive a rotational force generated by the control motor to rotate the pair of sliding pillars.

In addition, the bump stopper link may be configured to move with the first bump stopper in the downward direction as the pair of sliding pillars is rotated and move the second bump stopper to be positioned at a same height as that of the first bump stopper.

In addition, the first bump stopper is screw-coupled to the first sliding pillar to selectively move in the upward direction and the downward direction as the pair of sliding pillars is rotated, and the second bump stopper is coupled to the second sliding pillar and configured such that the second sliding pillar passes through an inside thereof and moves in the upward direction and the downward direction dependently via the bump stopper link as the first bump stopper moves in the upward direction and/or downward direction.

Meanwhile, the power transmission unit includes a first case configured to accommodate a one end of the first sliding pillar inside of the first case, the one end of the first sliding pillar protruding outside the fixing frame, a second case configured to accommodate a one end of the second sliding pillar inside of the second case, the one end of the second sliding pillar protruding outside the fixing frame, a drive member gear-coupled to the first sliding pillar inside the first case and being configured to receive a rotational force generated by the clutch unit to rotate the first sliding pillar so that the first bump stopper moves in the downward direction, and a transmission belt connected to a gear member that is gear-coupled to the sliding pillar inside the second case and being configured to (a) transmit the rotational force to the gear member as the drive member is rotated and rotate the second sliding pillar so that the second bump stopper moves in the upward direction or downward direction at the same time as the first bump stopper moves in the upward direction or downward direction.

Here, both the first bump stopper and the second bump stopper are screw-coupled to the pair of sliding pillars, respectively, to selectively move in the upward direction and the downward direction as the pair of sliding pillars is rotated.

In addition, the clutch unit includes a housing, a cover unit positioned at one end of the housing, an outer shaft having at least a portion thereof positioned in the housing and an end thereof passing through the housing, a plurality of lockers positioned inside of the housing and surrounding the outer shaft, and an input shaft having a one end and the other end opposite the one end, the one end being inserted into openings of the plurality of lockers and the other end being configured to pass through the cover unit, and wherein the outer shaft is restricted by the plurality of lockers so that the outer shaft and the plurality of lockers are rotated in a rotation direction of the input shaft thereby preventing a back drive.

Meanwhile, the control unit is configured to: (a) receive a stroke value from each wheel of a plurality of wheels, (b) compare a stroke difference value between left and right wheels of the plurality of wheels with a set threshold, and (c) determine that a roll has occurred when the stroke difference value is greater than the threshold.

Here, the control unit is configured to: (a) transmit the power transmission signal to the control motor when it is determined that the roll has occurred and (b) control the stopper unit to move in the downward direction so that an initial gap between the stopper unit and the knuckle unit is within a set range.

In addition, the control unit is configured to receive road gradient information and turning information from a vehicle navigation system and predict a roll occurrence situation based on the road gradient information and the turning information to transmit the power transmission signal to the control motor.

The control unit is configured to transmit the power transmission signal to the control motor if it is determined that the roll has occurred and controls the stopper unit to move in the downward direction so that an initial gap between the stopper unit and the knuckle unit is within a set range.

According to the present disclosure, it is possible to control the bump stopper to move in the downward direction toward the knuckle in the longitudinal direction of the sliding pillar by driving the control motor when it is determined that the roll has occurred based on the difference between the left and right wheel strokes of the front/rear corner modules with respect to the e-corner module independently provided on each wheel of the vehicle to reduce the gap between the bump stopper and the knuckle, thereby allowing the roll behavior to be controlled using the reaction force of the bump stopper due to the limitation of the stroke range of the knuckle.

Accordingly, according to the present disclosure, it is possible to allow the drive motor to selectively the clutch only in the condition in which it is determined that the roll has occurred to control the roll behavior, thereby minimizing the continuous use of power required to control the roll behavior.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
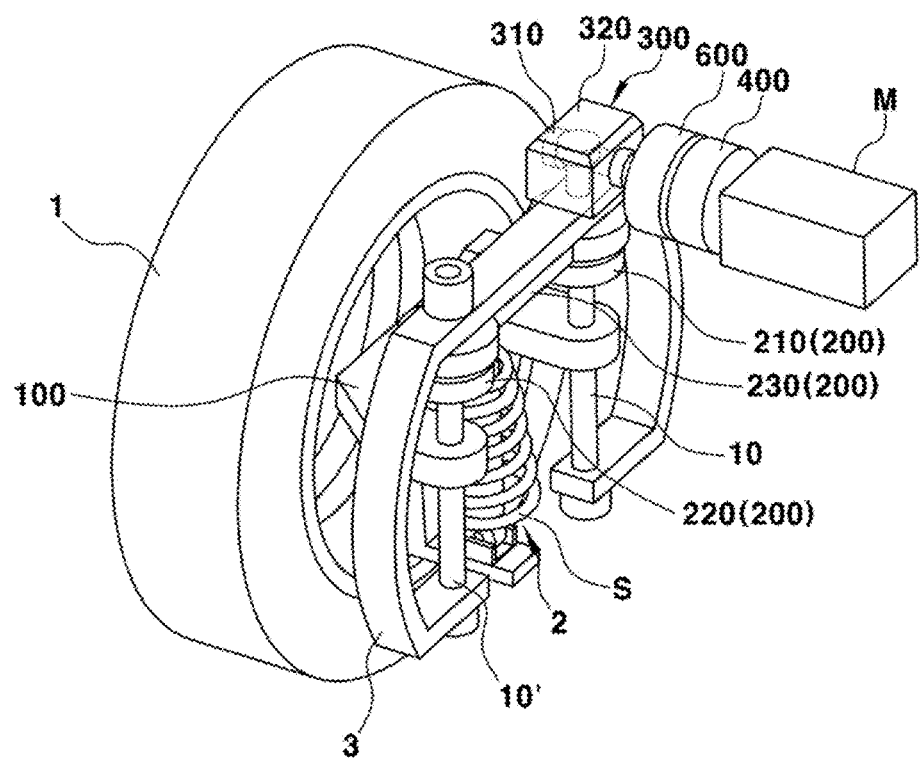
FIG. 1 is a view showing a structure of a roll control system for a corner module of a vehicle according to one embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments according to the present disclosure will be described in detail with reference to the accompanying drawings.

Advantages and features of the present disclosure, and a method for achieving the same, will become apparent with reference to the embodiments described below in detail in conjunction with the accompanying drawings.

However, the present disclosure is not limited to embodiments disclosed below but will be implemented in various different forms, and only these embodiments are provided so that the disclosure of the present disclosure will be thorough and complete and will fully convey the scope of the present disclosure to those skilled in the art to which the present disclosure pertains, and the present disclosure is only defined by the scope of the claims.

In addition, in the description of the present disclosure, when it is determined that related known technologies may obscure the gist of the present disclosure, detailed description thereof will be omitted.

Figure 2:
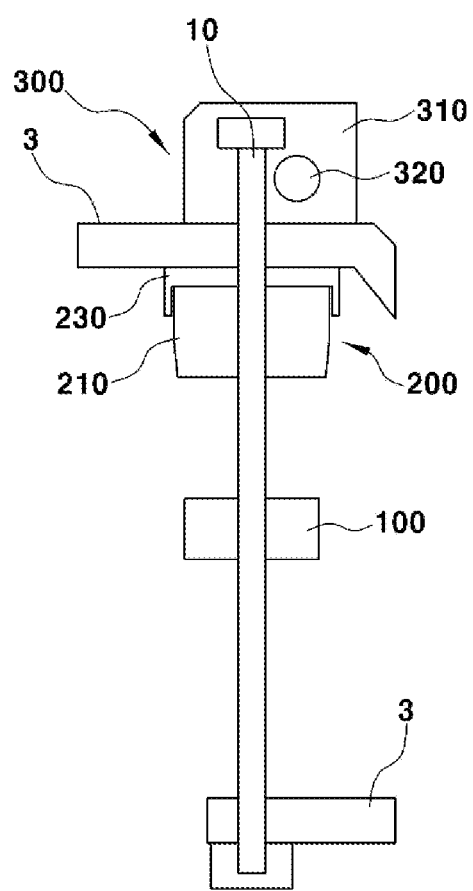
FIG. 2 is a view showing a stopper unit and a power transmission unit of the roll control system for the corner module of the vehicle according to one embodiment of the present disclosure.

FIG. 1 is a view showing a structure of a roll control system for a corner module of a vehicle according to one embodiment of the present disclosure, and FIG. 2 is a view showing a stopper unit and a power transmission unit of the roll control system for the corner module of the vehicle according to one embodiment of the present disclosure.

Figure 3A:
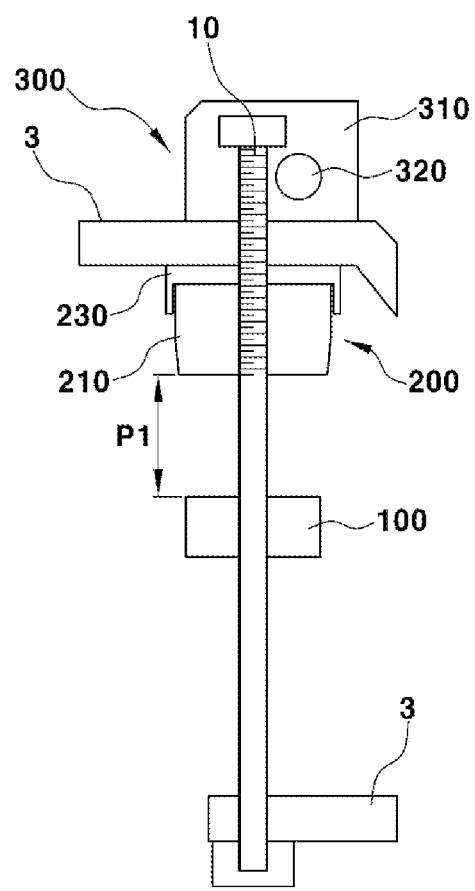
FIGS. 3A and 3B are views showing an operation of the stopper unit of the roll control system for the corner module of the vehicle according to one embodiment of the present disclosure.
Figure 3B:
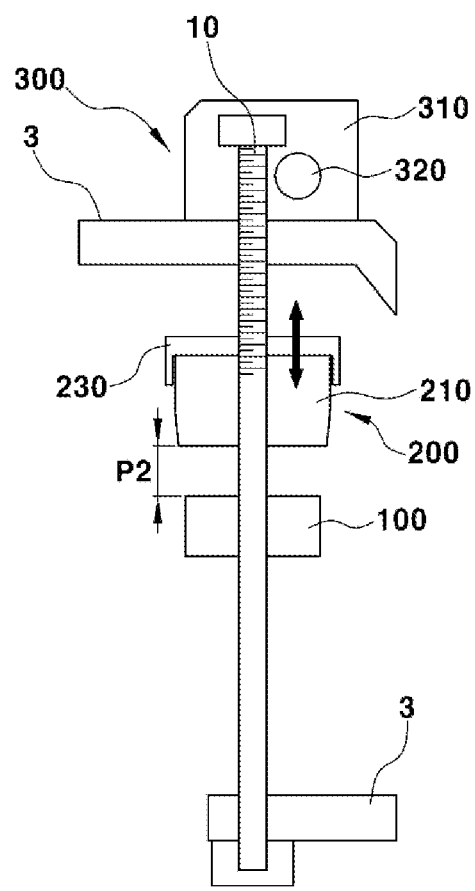
Figure 4:
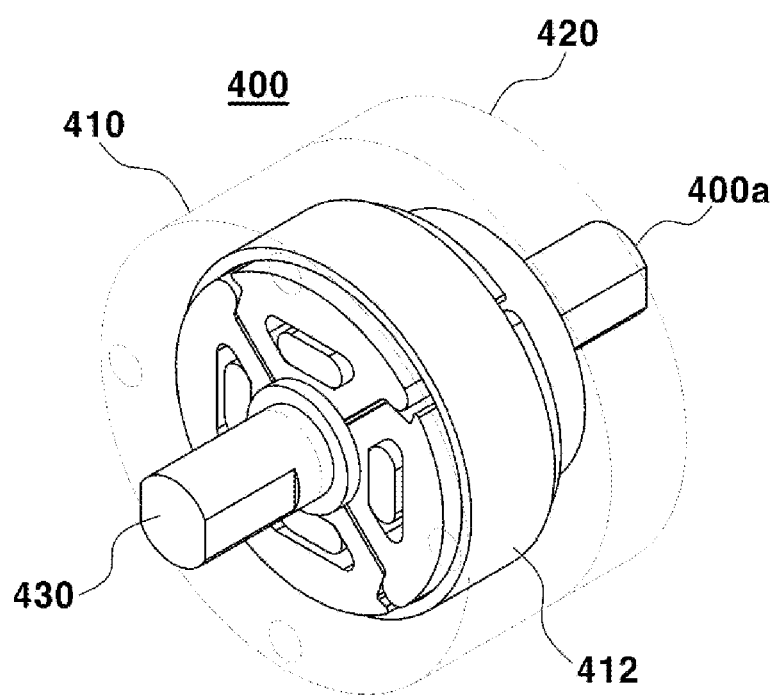
FIGS. 4 to 6 are views showing a clutch unit of the roll control system for the corner module of the vehicle according to one embodiment of the present disclosure.
Figure 5:
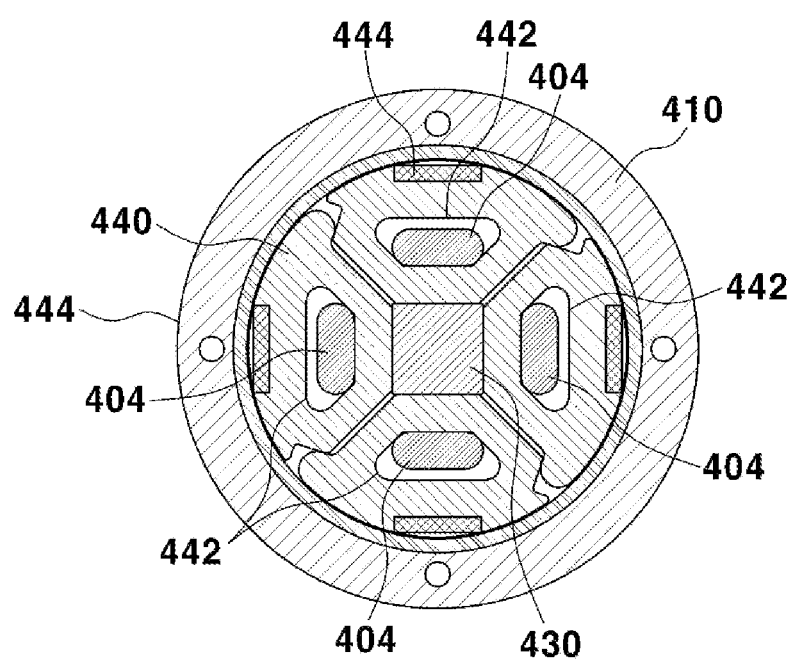
Figure 6:
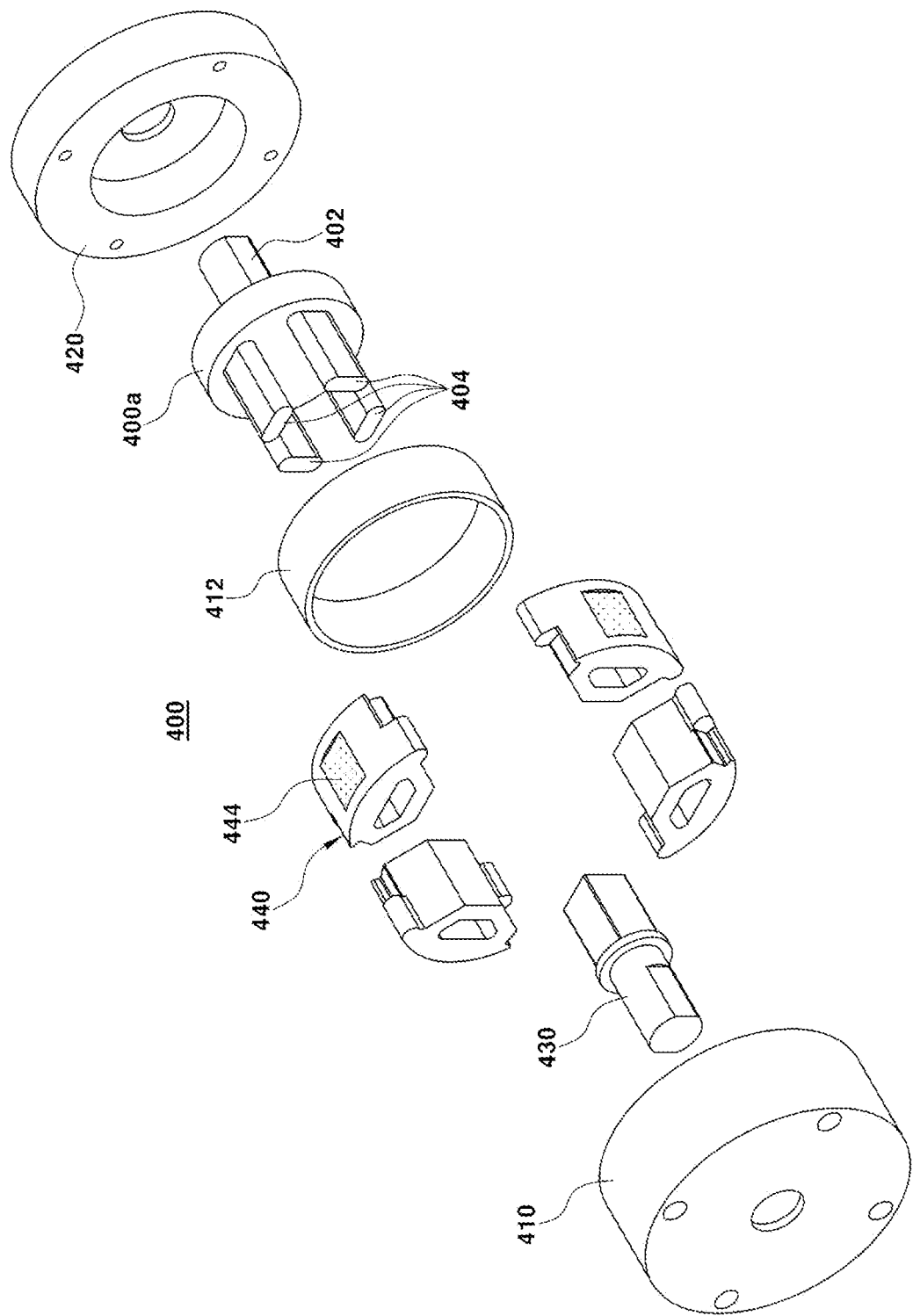

In addition, FIGS. 3A and 3B are views showing an operation of the stopper unit of the roll control system for the corner module of the vehicle according to one embodiment of the present disclosure, and FIGS. 4 to 6 are views showing a clutch unit of the roll control system for the corner module of the vehicle according to one embodiment of the present disclosure.

As shown in FIG. 1, a roll control system for a corner module of a vehicle according to this embodiment includes a knuckle unit 100, a stopper unit 200, a power transmission unit 300, a clutch unit 400, and a control unit 500.

The knuckle unit 100 is positioned on an inner surface of a wheel 1, substantially connected to a vehicle steering system (not shown), and coupled to a strut 2.

Here, the strut 2 is rotated with the knuckle unit 100 when the vehicle wheels are steered as the knuckle unit 100 is rotated, includes a shock absorber and a spring S along with the shock absorber, and serves to absorb and mitigate vibrations or impacts transmitted to a vehicle body through the vehicle wheels.

In addition, the knuckle unit 100 is configured to move in upward and downward directions along a pair of sliding pillars 10 and 10' supported by a fixing frame 3.

In other words, the knuckle unit 100 is provided to slidably move in the longitudinal directions of the sliding pillars 10, 10' in order to absorb the impact through the spring S of the strut 2 in a roll occurrence situation such as the vehicle repeatedly turning according to road gradient information.

The stopper unit 200 may be provided to selectively move in the upward and downward directions on the sliding pillars 10, 10', thereby limiting a range in which the knuckle unit 100 moves in the upward and downward directions.

To this end, the stopper unit 200 includes a first bump stopper 210, a second bump stopper 220, and a bump stopper link 230.

The first bump stopper 210 is mounted on one sliding pillar 10 of the pair of sliding pillars 10 and 10' inside the fixing frame 2, and disposed to be vertically spaced apart from one side of the knuckle unit 100.

The second bump stopper 220 is formed in the same shape as that of the first bump stopper 210, mounted on the other sliding pillar 10' of the pair of sliding pillars 10 and 10', and vertically spaced apart from the other side of the knuckle unit 100.

The bump stopper link 230 is each coupled to upper surfaces of the first bump stopper 210 and the second bump stopper 220, that is, disposed between the inner surface of the fixing frame 3 and the upper surfaces of the first bump stopper 210 and the second bump stopper 220 to be horizontally connected, and guides the first bump stopper 210 and the second bump stopper 220 to move in the upward and downward directions.

The bump stopper link 230 may also guide the second bump stopper 220 to move in the upward and downward directions together dependently as the first bump stopper 210 selectively moves in the upward and downward directions by the power transmission unit 300 to be described later because one side and the other side are connected by the link in a state of being coupled to the upper surfaces of the first bump stopper 210 and the second bump stopper 220, respectively.

The power transmission unit 300 is coupled to the fixing frame 3 and connected to the sliding pillar 10 and transmits power for moving the first bump stopper 210 in the upward and downward directions.

Here, the power transmission unit 300 includes a case 310 and a drive member 320.

The case 310 accommodates a protruding one side of the sliding pillar 10, on which the first bump stopper 210 is disposed outside the fixing frame 3.

In addition, as shown in FIG. 2, the drive member 320 is gear-coupled with the sliding pillar 10 inside the case 310 and receives a rotational force generated by a control motor M to rotate the sliding pillar 10.

More preferably, the protruding one side of the sliding pillar 10 and the drive member 320 are formed in a connection structure of a worm wheel gear, and thus rotates the sliding pillar 10 as a rotation occurs in the drive member 320 by the control motor M. Accordingly, the first bump stopper 210 moves in the upward and downward directions on the sliding pillar 10 screw-coupled.

The connection structure of the worm wheel gear between the sliding pillar 10 and the drive member 320 only corresponds to any one example adopted in this embodiment in order to move the first bump stopper 210 in the upward and downward directions and is not determined, and another structure in which the same operation may be performed may also be applied.

Meanwhile, the clutch unit 400 is connected to the power transmission unit 300 and transmits the rotational force to the power transmission unit 300 as the control motor M is driven.

As shown in FIGS. 4 to 6, the clutch unit 400 includes a housing 410, a cover unit 420, an outer shaft 430, a locker 440, and an input shaft 400*a*.

In other words, the clutch unit 400 includes the housing 410, and the cover unit 420 configured to surround an opened one end of the housing 4100 at one end of the housing 4100. The housing 410 is configured to have a circular cross section, and the cover unit 420 includes the outer shaft 430 configured to cover all the openings at one end of the housing 410, pass through the other end of the housing 410, and have at least one flat surface.

A plurality of lockers 440 configured to surround the flat surface of the outer shaft 430 are included inside the housing 410, and the input shaft 400*a* including one end inserted into an opening 442 positioned in each locker 440 is provided. The outer shaft 430 is configured to have flat surfaces corresponding to the number of lockers 440 positioned inside the housing 410.

More preferably, the outer shaft 430 according to this embodiment may be configured to have four flat surfaces corresponding to four lockers 440, and furthermore, the flat surface positioned on the outer shaft 430 is configured to be boned with the plurality of adjacent lockers 440 when the rotational force of the input shaft 400*a* is applied, so that the locker 440 and the outer shaft 430 may be configured to be selectively bonded with each other.

In addition, the input shaft 400*a* includes a drive transmission unit 402 configured to have at least a part in the longitudinal direction inserted into the opening 442 positioned in each locker 440 and the other end protruding to the outside of the cover unit 420 by passing through the cover unit 420. The drive transmission unit 402 is fastened to the control motor M configured to apply the rotational force and configured to be rotated integrally with the rotation direction of the control motor M.

Furthermore, the rotational force of the control motor M is configured to be applied to the drive transmission unit 402 positioned at the other end of the input shaft 400*a*, and the driving force applied to the drive transmission unit 402 is configured to rotate the outer shaft 430 through a rotation transmission unit 404.

More preferably, the control motor M is configured to transmit a driving force capable of rotating the input shaft 400*a*, and the plurality of lockers 440 are configured to come into surface contact with the flat surface of the outer shaft 430 in response to the rotational force of the input shaft 400*a*.

In addition, since the clutch unit 400 according to this embodiment includes all forms of the clutches that may be configured by being fastened to the motor, the clutch unit 400 may be positioned at one end of the motor configured to apply the driving force of the vehicle, one end of the motor configured to move the window in the upward and downward directions, one end of the motor configured to input a steering angle of an independent corner module, and one end of a posture control drive motor configured to control a posture of the vehicle body. In addition, the clutch unit 400 may be used as a clutch that is coupled to an engine as a drive unit and formed to transmit the driving force in one direction between a gear unit of a transmission and the engine.

The input shaft 400*a* includes the rotation transmission unit 404 inserted into the opening 442 formed in each of the plurality of lockers 440, and in this embodiment, includes four rotation transmission units 404 corresponding to four lockers 440, and each of the rotation transmission units 404 may maintain the state of being inserted into each of the openings 442 formed in the plurality of lockers 440. Furthermore, the rotation transmission unit 404 is rotated in the same direction as the rotation direction of the drive transmission unit 402, and the locker 440 coming into contact with the rotation transmission unit 404 through the opening 442 is configured to be rotated integrally in response to the rotation direction of the input shaft 400*a*.

The plurality of lockers 440 may be positioned inside the housing 410, and each locker 440 may be positioned adjacent to the flat surface of the outer shaft 430. The plurality of lockers 440 are positioned by being divided into at least two or more, and positioned to have a predetermined interval between the flat surface of the outer shaft 430 and the housing 410. More preferably, the flat surface of the outer shaft 430 is configured to have the same number as the number of lockers 440, so that the inner surface of each locker 440 may be positioned adjacent to the flat surface of the outer shaft 430.

In addition, when the rotational force of the input shaft 400*a* is applied, the inner one end of the locker 440 may be configured to come into contact with the flat surface formed on the outer shaft 430 and configured to be spaced apart from an inner circumferential surface of the housing 410 at a predetermined interval so that the input shaft 400*a*, the locker 440, and the outer shaft 430 are integrally rotated without interfering with the inner circumferential surface of the housing 410.

In addition, since a steel unit 412 is included on the inner circumferential surface of the housing 410, and a magnetic unit 444 is included on an outer circumferential surface of at least one locker 440, the magnetic unit 444 of the locker 440 may be moved to a position close to the inner circumferential surface of the housing 410 when the rotational force of the input shaft 400*a* is released. Furthermore, since a braking unit (not shown) positioned close to the inner circumferential surface of the housing 410 adjacent to the steel unit 412 is included, the outer circumferential surface of the locker 440 is moved to a position coming into contact with the braking unit by the magnetic force to propose the movement of the input shaft 400*a*.

In addition, even when the rotational force of the outer shaft 430 is applied, the flat surface of the outer shaft 430 may be configured to push the plurality of lockers 440 in a radial direction so that the braking unit positioned on the inner circumferential surface of the housing 410 and the outer circumferential surface of the locker 440 come into contact with each other to be fixed, thereby preventing the rotational force of the outer shaft 430 from being transmitted to the input shaft 400*a*, and preferably, the braking unit may be formed at a position relatively closer to the locker 440 than the steel unit 412, and thus configured to prevent the magnetic unit 444 of the locker 440 from coming into direct contact with the steel unit 412.

The locker 440 and the inner circumferential surface of the housing 410 may be configured to form a predetermined interval according to the position of the locker 440, so that the outer circumferential surface of the locker 440 is configured to be moved to the position adjacent to the inner circumferential surface of the housing 410 by a magnetic force of the magnetic unit 444 in a state in which the driving force of the input shaft 400a is released, and positioned so that the interval between the inner circumferential surface of the housing 410 and the outer circumferential surface of the locker 440 is minimized.

Conversely, when the input shaft 400a is rotated, the rotation transmission unit 404 of the input shaft 400a is positioned to come into contact with one end of the opening 442 of the locker 440 in a width direction, and the rotational force may be applied so that each locker 440 is rotated in the rotational force direction of the control motor M, and in this case, since the plurality of lockers 440 are positioned to come into contact with the flat surface of the outer shaft 430, the interval between the inner circumferential surface of the housing 410 and the outer circumferential surface of the locker 440 is converted into the maximum state, so that the locker 440 is positioned in a state of surface-restricting the outer shaft 430 without generating the reaction force with the housing 410 in response to the rotation of the input shaft 400a.

As described above, the clutch 10 according to this embodiment may be configured so that the locker 440 is spaced apart from the inner circumferential surface of the housing 410 and the outer shaft 430 is integrally rotated in response to the input shaft 400a rotated in a direction that is matched with the rotation direction applied from the control motor M, and configured to prevent a back drive phenomenon when the rotational force is released by limiting the movement of the input shaft 400a by the braking unit and the locker 440 coming into contact with each other when the rotational force applied to the input shaft 400a is released.

As a result, as described above, the clutch unit 400 according to this embodiment may limit the movement of the input shaft 400a when the rotational force applied to the input shaft 400a is released, more specifically, when the stopper unit 200 moves in a downward direction on the sliding pillars 10, 10' as the roll occurs, thereby preventing the back drive phenomenon, so that it is possible to maintain the state in which the stopper unit 200 has moved in the downward direction for controlling the roll behavior even without the continuous operation of the control motor M, thereby minimizing the use of the energy.

In this embodiment, although it has been described that the structure of the clutch unit 400 including a reducer unit 600 is applied as the structure of transmitting the rotational force for moving the stopper unit 200 in the upward and downward directions, this is not determined, and another structure capable of performing the same operation in order to prevent the back drive phenomenon may also be applied.

Meanwhile, the control unit 500 is electrically connected to the control motor M and transmits a power transmission signal to the control motor M to control the stopper unit 200 to selectively move in the upward and downward directions, thereby limiting the range in which the knuckle unit 100 moves in the upward and downward directions for controlling the roll behavior.

As described above, an operation for limiting the range in which the knuckle unit 100 moves in the upward and downward directions based on a control command according to the power transmission signal of the control unit 500 will be described with reference to FIGS. 3A and 3B as follows.

As shown in FIG. 3A, in a state in which the knuckle unit 100 and the first bump stopper 210 are spaced apart from each other to correspond to an initial gap P1, that is, in a normal mode, the control unit 500 receives a stroke value from each wheel 1 of the vehicle, compares a stroke difference value between the left and right wheels 1 with a set threshold, and determines that the roll has occurred when the stroke difference value is greater than the threshold.

As described above, when it is determined that the roll has occurred, the control unit 500 transmits the power transmission signal to the control motor M and controls the first bump stopper 210 to move in the downward direction so that the first bump stopper 210 moves in the downward direction through the clutch unit 400, more specifically, the gap between the first bump stopper 210 and the knuckle unit 100 becomes an initial gap P2 as shown in FIG. 3B.

Here, when the first bump stopper 210 moves in the downward direction, the bump stopper link 230 also moves in the downward direction together, and as the bump stopper link 230 moves in the downward direction, the second bump stopper 220 may move in the downward direction, that is, the second bump stopper 220 may move in the downward direction along the sliding pillar 10' dependently by the bump stopper link 230 and may be positioned at the same height as that of the first bump stopper 210, and as a result, the first bump stopper 210 and the second bump stopper 220 may limit the range in which the first bump stopper 210 and the second bump stopper 220 move in the upward and downward directions at the same height with respect to the knuckle unit 100 that moves in the upward and downward directions along the pair of sliding pillars 10, 10' in the roll occurrence situation, thereby effectively controlling the roll behaviors of the left and right wheels 1 (see FIG. 1).

Preferably, the outer circumferential surface of the sliding pillar 10 of the pair of sliding pairs 10, 10' to which the first bump stopper 210 is coupled may be formed in the form of having a thread so that the screw-coupled first bump stopper 210 may move in the upward and downward directions upon rotation, and the outer circumferential surface of the sliding pillar 10' of the pair of sliding pillars 10, 10' to which the second bump stopper 220 is coupled may also be formed in a pipe form with the thread deleted so that the second bump stopper 220 may move in the upward and downward directions dependently by the bump stopper link 230 that moves in the downward direction.

In addition, as described above, the control unit 500 may determine that the roll has occurred when the stroke difference value between the left and right wheels 1 is greater than the set threshold and control the range in which the knuckle unit 100 moves in the upward and downward directions to be limited, but in addition thereto, may also receive road gradient information and turning information from a vehicle navigation system, predict the roll occurrence situation in advance based on the road gradient information and the turning information, and transmit the power transmission signal to the control motor M, so that the range in which the knuckle unit 100 moves in the upward and downward directions may also be limited through the control of the stopper unit 200.

In other words, when the roll occurrence situation is predicted based on the road gradient information and the turning information, the control unit 500 transmits the power transmission signal to the control motor M and controls the first bump stopper 210 to move in the downward direction so that the first bump stopper 210 moves in the downward direction through the clutch unit 400, more specifically, the initial gap P2 between the first bump stopper 210 and the knuckle unit 100 is within the set range as shown in FIG. 3B. Accordingly, the second bump stopper 220 may also move in the downward direction to the same height by the bump stopper link 230, thereby limiting the range in which the knuckle unit 100 moves in the upward and downward directions for controlling the roll behavior.

In addition, the control unit 500 controls the control motor M so that the first bump stopper 210 moves in an upward direction to the initial position when the stroke difference value between the left and right wheels 1 is smaller than the set threshold or when it is determined (predicted) that the roll occurrence situation has been released based on the road gradient information and the turning information, and terminates the operation of the control motor M when it is determined that the position corresponds to the initial gap P1, so that the first bump stopper 210 and the second bump stopper 220 are maintained at the positions corresponding to the initial gap P1 by the clutch unit 400.

Figure 7:
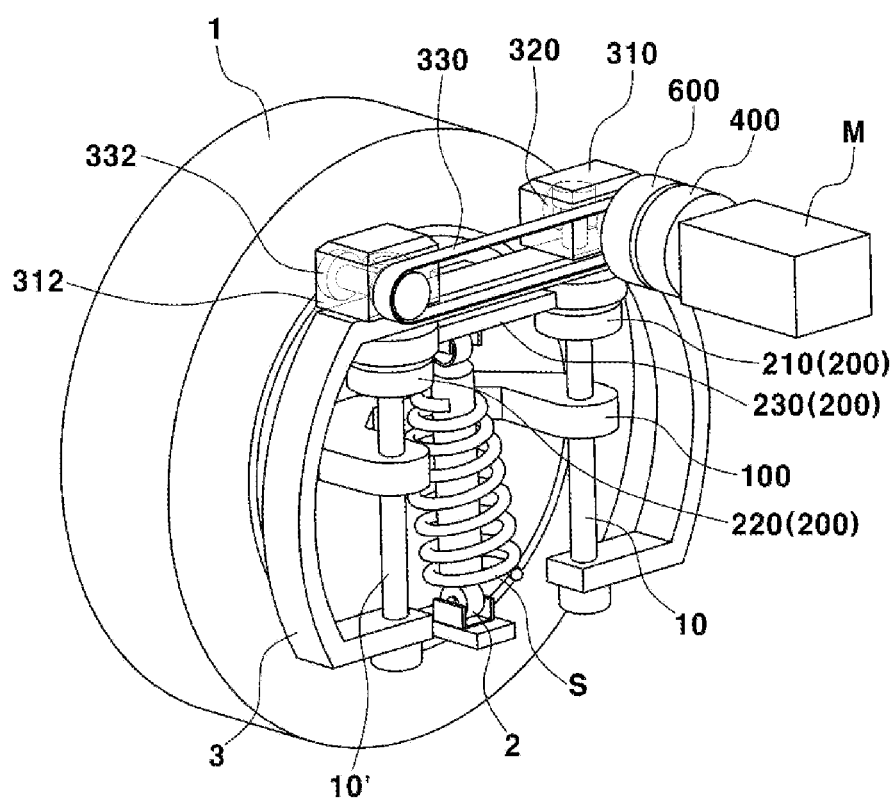
FIG. 7 is a view showing a structure of a roll control system for a corner module of the vehicle according to another embodiment of the present disclosure.

Hereinafter, FIG. 7 is a view showing a structure of a roll control system for a corner module of a vehicle according to another embodiment of the present disclosure.

As shown in FIG. 7, a roll control system for a corner module of a vehicle according to this embodiment includes the knuckle unit 100, the stopper unit 200, the power transmission unit 300, the clutch unit 400, and the control unit 500.

Since a configuration excluding the power transmission unit 300 in the roll control system for the corner module of the vehicle according to this embodiment is the same as in the above-described embodiment, in this embodiment, a detailed description of the corresponding configuration will be omitted.

The power transmission unit 300 includes a first case 310, a second case 320, a drive member 320, and a transmission belt 340.

The first case 310 accommodates a protruding one side of the sliding pillar 10 on which the first bump stopper 210 is disposed outside the fixing frame 3.

The second case 312 is mounted adjacent to the first case 310 outside the fixing frame 3 and accommodates a protruding one side of the sliding pillar 10' on which the second bump stopper 220 is disposed.

The drive member 320 is gear-coupled with the protruding one side of the sliding pillar 10 inside the first case 310 and serves to receive the rotational force generated by the control motor M through the reducer unit 600 and rotate the sliding pillar 10 so that the first bump stopper 210 selectively moves in the downward direction in the roll occurrence situation.

The transmission belt 330 is connected to a gear member 332 that is gear-coupled to the sliding pillar 10' inside the second case 312 and serves to transmit the rotational force to the gear member 332 having the same structure as that of the drive member 320 as the drive member 320 is rotated by the control motor M and rotate the sliding pillar 10' so that the second bump stopper 220 moves in the upward and downward directions at the same time as the first bump stopper 210.

More preferably, the outer circumferential surfaces of the pair of sliding pillars 10 and 10' may be formed in the form of having the thread so that the first bump stopper 210 and the second bump stopper 220 may move in the upward and downward directions by the rotation.

In the above structure, when the control motor M is driven by the control unit 500, the rotational force generated by the clutch unit 400 may be transmitted to both the pair of sliding pillars 10 and 10' through the transmission belt 330 so that the first bump stopper 210 and the second bump stopper 220 may simultaneously move in the upward and downward directions (see FIGS. 3A and 3B), and thus the range in which the knuckle unit 100 moves in the upward and downward directions in the roll occurrence situation may be limited, and accordingly, the roll behavior may be effectively controlled by the knuckle unit 100 using the reaction force generated by moving the first bump stopper 210 and the second bump stopper 220 in the downward direction due to the limitation of the range in which the first bump stopper 210 and the second bump stopper 220 move in the upward and downward directions.

According to the present disclosure, when it is determined that the roll has occurred based on the difference between the left and right wheel strokes for the front/rear corner modules with respect to the e-corner module independently provided on each wheel of the vehicle, the bump stopper is controlled to move in the downward direction toward the knuckle in the longitudinal direction of the sliding pillar by the control motor to reduce the gap between the bump stopper and the knuckle, so that when the roll occurs, the roll behavior can be controlled using the reaction force of the bump stopper due to the limitation of the stroke range of the knuckle.

Accordingly, according to the present disclosure, the control motor can be operated to control the roll behavior only in the condition in which it is determined that the roll has occurred, thereby minimizing the continuous use of power required to control the roll behavior.

While the present disclosure has been described above with reference to the embodiment(s) shown in the drawings, this is only illustrative, and those skilled in the art will understand that various modifications are possible therefrom, and all or some of the above-described embodiment(s) may also be selectively combined and configured. Accordingly, the true technical scope of the present disclosure should be defined by the technical spirit of the appended claims.

What is claimed is:

1. A roll control system for a corner module of a vehicle comprising:
    a knuckle coupled to a strut, the knuckle and strut being configured to be positioned inside a wheel, the knuckle being configured to move in an upward direction and a downward direction along a first pillar and a second pillar of a pair of sliding pillars that are supported by a fixing frame;
    a stopper configured to selectively move in a downward direction along the pair of sliding pillars and limit a range in which the knuckle moves in the upward direction and the downward direction;
    a power transmission connected to at least one pillar of the pair of sliding pillars and being configured to transmit power for selectively moving the stopper in the downward direction;
    a clutch connected to the power transmission and being configured to transmit a rotational force to the power transmission upon driving of a control motor; and
    a controller configured to be electrically connected to the control motor and being configured to selectively transmit a power transmission signal to the control motor to control the stopper to selectively move in the upward direction and the downward direction.

2. The roll control system for the corner module of claim 1, wherein the stopper includes:
    a first bump stopper mounted on the first pillar of the pair of sliding pillars inside the fixing frame and being spaced apart from the knuckle;
    a second bump stopper mounted on the second pillar of the pair of sliding pillars; and
    a bump stopper link connected to the first bump stopper and the second bump stopper and being configured to guide the first bump stopper and the second bump stopper to move in the downward direction.

3. The roll control system for the corner module of claim 2, wherein the power transmission includes:
a case configured to accommodate a one end of the first sliding pillar inside of the case, the one end protruding outside the fixing frame; and
a drive member gear-coupled to the first sliding pillar inside of the case and being configured to receive a rotational force generated by the control motor to rotate the pair of sliding pillars.

4. The roll control system for the corner module of claim 3, wherein the bump stopper link is configured to move with the first bump stopper in the downward direction as the pair of sliding pillars is rotated and move the second bump stopper to be positioned at a same height as that of the first bump stopper.

5. The roll control system for the corner module of claim 4, wherein:
the first bump stopper is screw-coupled to the first sliding pillar to selectively move in the upward direction and the downward direction as the pair of sliding pillars is rotated, and
the second bump stopper is coupled to the second sliding pillar and configured such that the second sliding pillar passes through an inside thereof and moves in the upward direction and the downward direction dependently via the bump stopper link as the first bump stopper moves in the upward direction and the downward direction.

6. The roll control system for the corner module of claim 2, wherein the power transmission includes:
a first case configured to accommodate a one end of the first sliding pillar inside of the first case, the one end of the first sliding pillar protruding outside the fixing frame;
a second case configured to accommodate a one end of the second sliding pillar inside of the second case, the one end of the second sliding pillar protruding outside the fixing frame;
a drive member gear-coupled to the first sliding pillar inside the first case and being configured to receive a rotational force generated by the clutch to rotate the first sliding pillar so that the first bump stopper moves in the downward direction; and
a transmission belt connected to a gear member that is gear-coupled to the second sliding pillar inside the second case and being configured to: (a) transmit the rotational force to the gear member as the drive member is rotated and rotate the second sliding pillar so that the second bump stopper moves in the upward direction or downward direction at the same time as the first bump stopper moves in the upward direction or downward direction.

7. The roll control system for the corner module of claim 6, wherein both the first bump stopper and the second bump stopper are screw-coupled to the pair of sliding pillars, respectively, to selectively move in the upward direction and the downward direction as the pair of sliding pillars is rotated.

8. The roll control system for the corner module of claim 1, wherein the clutch includes:
a housing;
a cover positioned at one end of the housing;
an outer shaft having at least a portion thereof being positioned in the housing and the other end thereof passing through the housing;
a plurality of lockers positioned inside of the housing and surrounding the outer shaft; and
an input shaft having a one end and the other end opposite the one end, the one end being inserted into openings of the plurality of lockers and the other end being configured to pass through the cover, and
wherein the outer shaft is restricted by the plurality of lockers such that the outer shaft and the plurality of lockers are rotated in a rotation direction of the input shaft thereby preventing a back drive.

9. The roll control system for the corner module of claim 1, wherein the controller is configured to:
(a) receive a stroke value from each wheel of a plurality of wheels,
(b) compare a stroke difference value between left and right wheels of the plurality of wheels with a set threshold, and
(c) determine that a roll has occurred when the stroke difference value is greater than the threshold.

10. The roll control system for the corner module of claim 9, wherein the controller is configured to:
(a) transmit the power transmission signal to the control motor when it is determined that the roll has occurred and
(b) control the stopper to move in the downward direction so that an initial gap between the stopper and the knuckle is within a set range.

11. The roll control system for the corner module of claim 1, wherein the controller is configured to receive road gradient information and turning information from a vehicle navigation system and predict a roll occurrence situation based on the road gradient information and the turning information to transmit the power transmission signal to the control motor.

12. The roll control system for the corner module of claim 11, wherein the controller is configured to transmit the power transmission signal to the control motor if it is determined that the roll has occurred and control the stopper to move in the downward direction so that an initial gap between the stopper and the knuckle is within a set range.

13. The roll control system for the corner module of claim 1, further comprising the wheel.

14. The roll control system for the corner module of claim 1, further comprising the control motor.

15. The roll control system for the corner module of claim 14, further comprising a vehicle to which the wheel is mounted.

16. A vehicle comprising a plurality of wheels, each wheel having a corresponding one roll control system for the corner module of claim 1.

* * * * *